Figure 1:
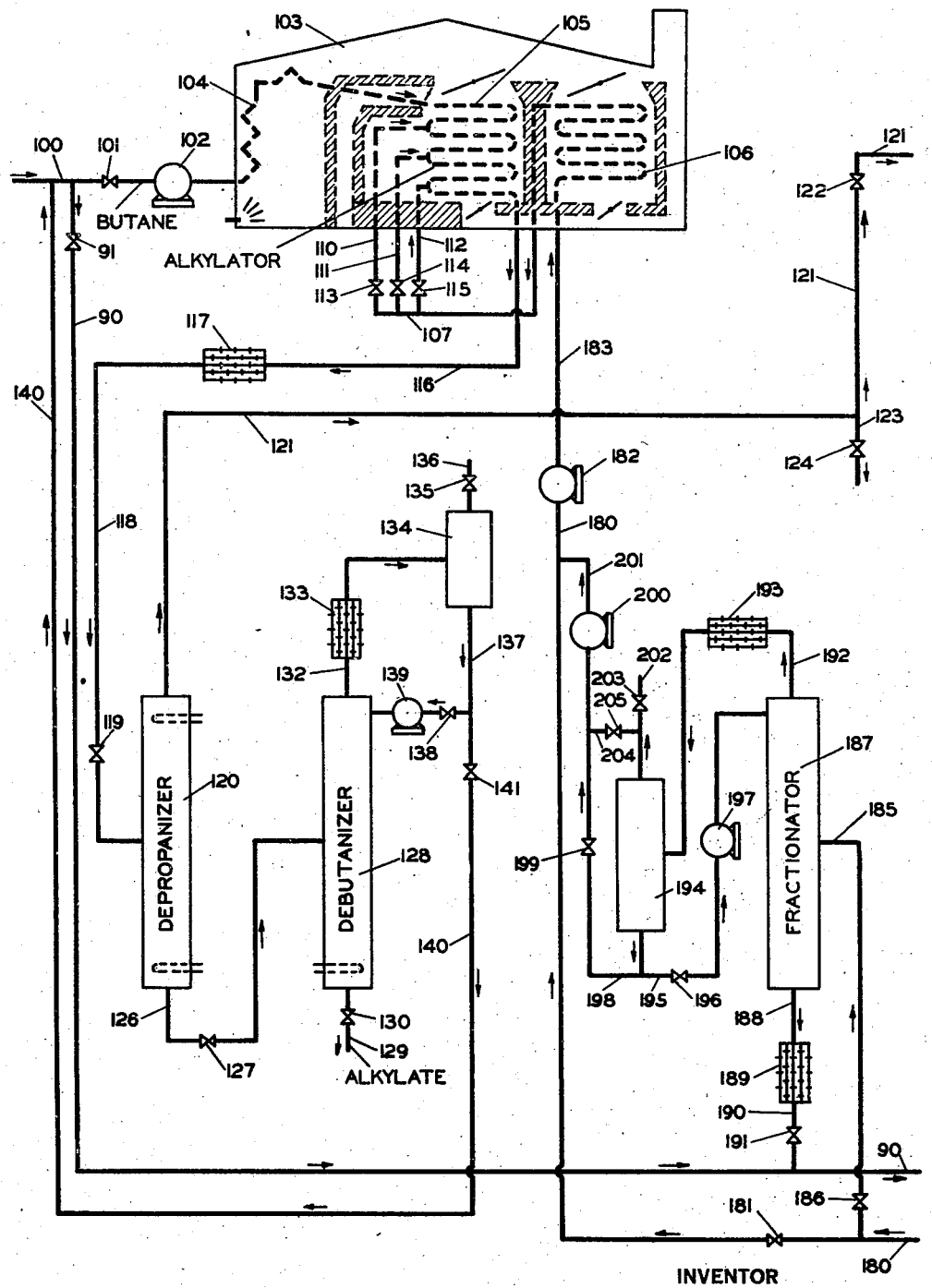

May 25, 1943.  K. H. HACHMUTH  2,320,127
TREATMENT OF HYDROCARBONS
Filed Sept. 9, 1940  2 Sheets-Sheet 2
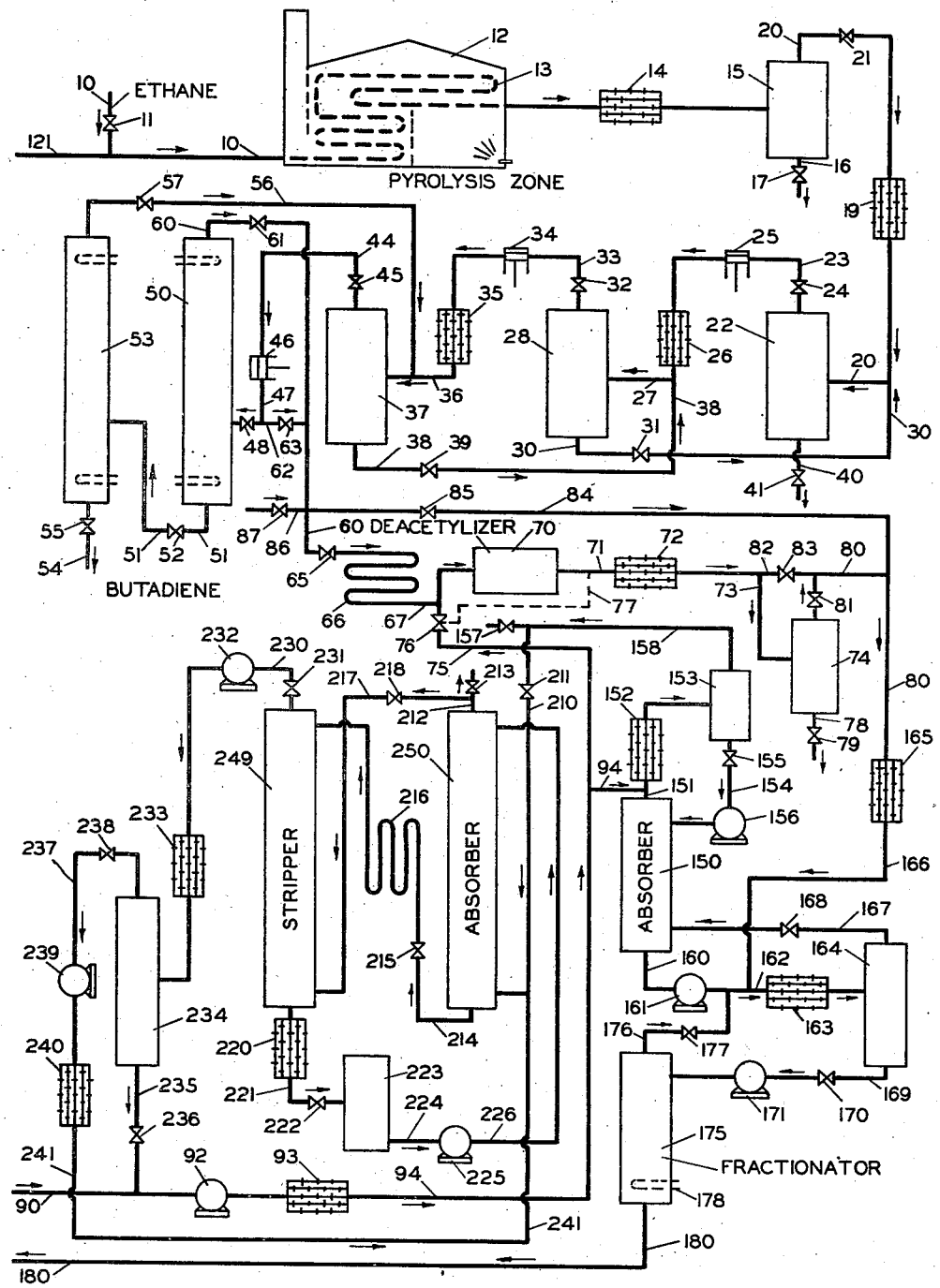
FIG. IA
INVENTOR
KARL H. HACHMUTH
BY
ATTORNEY Patented May 25, 1943

2,320,127

UNITED STATES PATENT OFFICE 2,320,127

TREATMENT OF HYDROCARBONS

Karl H. Hachmuth, Bartlesville, Okla., assignor to Phillips Petroleum Company, a corporation of Delaware Application September 9, 1940, Serial No. 356,084

9 Claims. (Cl. 260—683.4)

This invention relates to the treatment of hydrocarbons, especially to the separation of heavier low boiling hydrocarbons from light gases. It relates more particularly to the separation of gaseous olefins from lighter gases in a step which is used in combination with a hydrocarbon conversion step.

In the conversion of normally gaseous paraffin hydrocarbons heavier than methane into normally liquid hydrocarbons, it is generally preferable first to convert at least a part of the paraffins into olefins. Such a conversion is always accompanied by the production of appreciable amounts of free hydrogen when carried out directly, and is often accompanied also by the production of methane. There is considerable production of methane when the conversion to olefins is completely noncatalytic, especially when substantial amounts of propane or heavier paraffins are undergoing conversion, and there is an appreciable production of methane when the conversion is catalytic and is carried out with rather high extents of conversion. When the hydrogen is not removed from the mixture produced by the conversion to olefins it sometimes produces adverse effects in the subsequent production of liquid hydrocarbons, and in other cases both the hydrogen and any methane act as volatile diluents and make it difficult to compress the olefin-containing mixtures to elevated pressures suitable for subsequent production of liquids.

In the copending applications of Frederick E. Frey Serial No. 71,763 filed March 30, 1936, now Patent 2,314,040, which is a division of his application Serial No. 636,555 filed October 6, 1932, now Patent 2,038,834, and Serial No. 82,954 filed June 1, 1936, now Patent 2,270,700, it is disclosed that such a separation of undesired hydrogen and methane from olefin hydrocarbons may be accomplished in an absorption process using as absorbents such easily liquefiable, low boiling materials as butane and/or pentane, and the like. In these processes the enriched absorption liquid may be passed to a subsequent conversion step for the production of liquid hydrocarbons.

I have now found that such an absorption and olefin concentration process may be carried out in an economical manner by a novel arrangement and combination of absorption and fractionation steps which permit a substantially complete absorption of the desired olefin hydrocarbons and which reduces to a minimum the loss by vaporization of the relatively volatile absorption medium used in such a process. I have also found that when the subsequent production of liquid hydrocarbons is an alkylation process that the olefin concentration in the rich absorption liquid may be undesirably low, and that I may increase this olefin concentration by a suitable novel process to be more completely described hereinafter.

It is an object of my invention to separate normally gaseous hydrocarbons from hydrogen and/or methane.

Another object of my invention is to effect a concentration of low boiling olefins from dilute mixtures containing lower boiling paraffins.

A further object of my invention is to effect a concentration of low boiling olefins from dilute mixtures containing higher boiling paraffins.

Still another object of my invention is to use an absorption liquid such as butane and/or pentane in the concentration of gaseous olefins.

Another object of my invention is to pyrolyze ethane and or propane and recover a free hydrogen concentrate, an ethylene concentrate, and a highly unsaturated hydrocarbon concentrate comprising hydrocarbons of four and more carbon atoms per molecule.

Further objects and advantages of my invention will become evident from the accompanying disclosure and discussion.

In conventional absorption systems, a gas to be treated is passed to a low point of an absorber and an absorption liquid is passed to a high point of the absorber, with all contact between the absorption liquid and the gas taking place within the absorber. In many instances either the absorption liquid or the gas, or both, are subjected to subatmospheric cooling before being passed to the absorber. In some modifications the absorption oil, in its passage down the absorber, is removed and subjected to additional cooling, or cooling coils are placed inside the absorber, to effect a removal of heat of absorption.

I have now found that when a relatively volatile absorbent is used, the absorption can be carried out more efficiently in two steps rather than in a single unit. For convenience, the steps may be referred to as an absorption step and a fractionating step, and although the fractionating step is adapted to be practiced on what corresponds roughly to a rich absorbent it does not correspond to conventional fractionating steps in which a rich absorbent is denuded of the absorbed constituents, for the liquid product from this part of my process contains all the desired absorbed materials together with the absorbent. Thus the absorbent liquid is introduced to the top of the absorber and the liquid withdrawn from the bottom is cooled and passed to a liquid-vapor separator. The gas to be treated in my process is also cooled and passed to the same separator, and likewise the vapors from the top of the fractionator are cooled and passed to this separator. The uncondensed gases and vapors from this separator are then the components of the gaseous stream passed to the absorber which is introduced to a low point thereof. The liquid material from this separator is passed to the fractionator, and is introduced to the top part thereof in the nature of a reflux liquid. Undesired gases are removed from the top of the absorber, and the rich absorbent containing in solution the desired constituents of the gas charged to the process is removed from the bottom of the fractionator.

I have further found that, in the practice of a preferred modification of my invention, the vapor and liquid stream are preferably combined before cooling, and subjected to cooling and condensation in admixture with each other rather than as separate streams. Thus, I prefer to mix the aforesaid liquid from the absorber, vapor from the fractionator, and gas charged to the process, and subject the resultant composite mixture to a single cooling operation, and pass the single cooled mixture to a separator. Likewise, rather than introducing the absorbent liquid directly to the top of the absorber, I prefer to mix it with the gas stream leaving the top of the absorber and to subject the resulting mixture to cooling and condensation. This cooled mixture is then passed to a separator, the uncondensed gas from the separator is discharged from the process, or further treated as may be desired, and the liquid from this separator is passed to the top of the absorber as the absorption liquid.

Reference will now be made to the accompanying drawings which form a part of this specification, and which illustrate diagrammatically by means of a flow sheet one arrangement of apparatus suitable for practicing my invention in its preferred form. It will be described in combination with a thermal alkylation process for the conversion of low boiling aliphatic hydrocarbons to paraffins in the motor fuel boiling range, a combination which serves as an example of my invention and one that I have found to be particularly desirable. However, it will be understood that other thermal conversion processes may form a part of the combination, or that other alkylation processes may form a part of the combination, with suitable modifications in any particular case as will be readily ascertained or determined by trial by one skilled in the art in the light of the present disclosure, and that this also applies to charge stocks different from those specifically discussed.

Figs. 1 and 1A together illustrate the process. In this combination, a light gaseous hydrocarbon material such as a mixture comprising ethane and propane, is passed from any desirable source through pipe 10 and valve 11 to the cracking and dehydrogenating furnace 12. This mixture is heated and cracked in coil 13 at a low superatmospheric pressure of the order of 5 to 30 pounds per square inch and at a temperature of 1300 to 1600° F. for a time sufficient to form an optimum amount of ethylene and propylene with only minor amounts of light oils. If desired, a suitable dehydrogenating catalyst, not shown, may be used in place of or along with the cracking operation, especially when a heavier stock is being dehydrogenated to produce higher boiling unsaturates, but for the charge stocks here specifically described the simple cracking and dehydrogenation is adequate. The cracked material is passed through cooler 14 to a separator or tar scrubber 15, wherein any tar-like material and/or carbon separates from the gaseous stream and is removed through pipe 16 and valve 17. A gaseous stream is passed from tar scrubber 15 through pipe 20 and valve 21 and through cooler 19 to scrubber 22, being joined by any liquid materials separated as a result of subsequent compression which are passed through pipe 30. The gaseous material in scrubber 22 is passed through pipe 23 and valve 24 to a compressor 25, which increases the pressure from about 0.5 to 10 pounds per square inch gauge to about 40 to 60 pounds per square inch. The material is then passed through cooler 26 and pipe 27 to scrubber 28. Any liquid material which separates out in scrubber 28 is removed through pipe 30 and valve 31 to scrubber 22, as by being introduced into pipe 20. A gas stream is passed from scrubber 28 through pipe 33 and valve 32 to a compressor 34, which increases the pressure from about 40 to 60 pounds per square inch gage to about 190 to 240 pounds per square inch gage, and compressed gas is then passed through cooler 35 and pipe 36 to scrubber 37. Any liquid material which separates out in scrubber 37 is removed through pipe 38 and valve 39 to scrubber 28, as by being introduced into pipe 27, as shown. Light oils and other condensates which ultimately remain liquid in scrubber 22 can be removed from the system through pipe 40 and valve 41.

A gas stream is passed from scrubber 37 through pipe 44 and valve 45 to a compressor 46 and is there compressed to about 700 to 850 pounds per square inch gage, and is then passed through pipe 47 and valve 48 to fractionator 50. Fractionator 50 may be of any suitable type known to the art, comprising bubble plates and heating and cooling units to effect adequate fractionation in the presence of liquid reflux. A liquid is removed from the bottom through pipe 51 and valve 52, and is passed to fractionator 53, similar to fractionator 50 but operating at about 250 pounds per square inch pressure. Undesired liquid material, in this case consisting of $C_4$ and heavier hydrocarbons and containing an appreciable amount of butadiene produced as one of the reaction products under conditions such as described for coil 13, is removed from the system through pipe 54 and valve 55. Gaseous material which should be retained is passed from fractionator 53 through pipe 56 and valve 57 back to the system, and in this case is reintroduced into pipe 36. Light gases freed of heavier material pass from fractionator 50 through pipe 60 and valve 61.

It will, of course, be appreciated that other separating means than fractionators 50 and 53 may be used, such as a suitable absorption apparatus with auxiliary equipment, not shown. If it is not necessary or desirable to separate heavier material at this point, such apparatus may be eliminated completely, and the gas compressed by compressor 46 passed directly through pipes 47 and 62, and valve 63, to pipe 60.

When thermal cracking is employed under the conditions such as described for coil 13, an appreciable amount of acetylene is produced, which is preferably removed before subsequent treatment. This can be done by passing the gases through valve 65 to heater 66 and through pipe 67 to deacetylizer 70. These gases contain hydrogen produced by the previous dehydrogenation, and the acetylene may be removed by a selective hydrogenation in the presence of a suitable catalyst, such as one comprising nickel and chromium. If this is not desirable, another method may be used which involves a selective polymerization, as by passing the material at an elevated temperature over bauxite. Such treatment will also remove butadiene and the like if this has not been previously removed. The effluent is passed through pipe 71 cooler 72 and pipe 73 to scrubber 74. In order to accomplish a suitably selective removal of acetylene without involving any appreciable amount of desired unsaturated material in the reaction, a close temperature control is necessary. Any tendency of the temperature to increase unduly can be quickly and effectively met by introducing butane into the stream passing through pipe 67, as from pipe 94 through pipe 75 and valve 76. Valve 76 may be operated automatically by a temperature responsive device represented by the dashed line 77 in pipe 71 at the exit of deacetylizer 70. Heavier hydrocarbons, such as acetylene polymers, may be removed from the system through pipe 78 and valve 79. Acetylene-free gases are passed from scrubber 74 through pipe 80 and valve 81. If it is not necessary to include scrubber 74, the effluent of 70 may be passed through pipe 82 and valve 83 directly to pipe 80. When it is not necessary to employ an acetylene removal step, gases may be passed directly from pipe 60 to pipe 80 through by-pass 84 and valve 85. When a gaseous mixture of a desirable composition is available from some other source, not shown, such as an oil cracking process, it may be introduced to the process, as through pipe 86 and valve 87, either to be added to the material just described passing through pipe 60, or as the entire source of such material, as may be expedient. It may or may not be passed through the deacetylizer 70, as desired or as its composition requires.

When a thermal alkylation step is a part of my process, such as is broadly described in Frey 2,002,394, a liquid butane stream, preferably comprising a high concentration of isobutane, is charged to the process through pipe 100. In accordance with the present invention a portion of this stream is passed through pipe 90 and valve 91 to pump 92, and thence through a cooler 93, if desired, and pipe 94 as an absorption liquid to aid in the separation of light gases such as hydrogen and methane from heavier hydrocarbons such as ethylene and propylene, all of which are present in the mixture passing through pipe 80. In this modification of my invention, an absorber 150 is operated at a pressure between about 700 and 800 pounds per square inch, such as about 765 pounds per square inch. Unabsorbed gases pass from the top of the absorber 150 through pipe 151 at a temperature of about 0 to 10° F., and are intimately admixed with the liquid butane absorbent introduced through pipe 94. The mixture is passed through a cooler and condenser 152, wherein the mixture is cooled to about —20 to —40° F. as by indirect heat exchange with vaporizing propane, which may be used as a refrigerant by additional conventional equipment, not shown, or with some other cooling medium of a temperature of about —40 to —50° F. The mixture, preferably at a temperature of about —30° F., is passed to a separator 153, wherein a separation is effected between gas and liquid phases. The liquid is passed from separator 153 through pipe 154 and valve 155, and is sent by pump 156 to a point near the top of the absorber 150 as absorption liquid. The gas phase is passed from separator 153 through pipe 158, and may be discharged from the system through valve 157, or may be processed to recover vaporized butane, as will be discussed hereinafter.

A liquid containing absorbed olefins, is removed from the bottom of the absorber 150 through pipe 160 and is passed through pump 161 and pipe 162 to cooler 163 and separator 164. There is admixed with the stream passing through pipe 162 to cooler 163 the gaseous stream passing through pipe 80, which is cooled to a suitable temperature by cooler 165 and is introduced through pipe 166. There is also admixed with this material a gaseous stream which is passed from the top of fractionator 175 through pipe 176 and valve 177. The composite, intimately mixed material, under a pressure somewhat higher than that existing in absorber 150, is cooled in cooler 163 to a temperature between about —10 and —35° F. generally about —15 to —30° F. in this particular case. This may be accomplished by indirect heat exchange with vaporizing propane, or other cooling medium at a temperature of about —40° F., as will be readily appreciated. In separator 164 a separation is effected between gas and liquid phases. The uncondensed gaseous material is passed through pipe 167 and valve 168 to absorber 150 at a point near the bottom. The liquid is passed from separator 164 through pipe 169 and valve 170, and is sent by pump 171 as a reflux liquid to fractionator 175 at a point near the top.

A rich absorption liquid containing absorbed olefins such as ethylene and propylene, is removed from the bottom of fractionator 175 at a temperature of about 100 to 125° F., the bottom of the fractionator being suitably heated, as by a heating coil 178, and is passed through pipe 180 and valve 181 to pump 182 for introduction through pipe 183 to the alkylation process, to be subsequently described. If desired, the olefins may be passed to the alkylation step in a more concentrated form, in which case all or a part of the stream is removed from pipe 180 through pipe 185 and valve 186, and is passed to fractionator 187. In fractionator 187 the light absorbed olefins, together with a part of the absorption butane, are vaporized, the fractionating column being suitably heated at the bottom, to a temperature of about 190 to 240° F., while a pressure of about 250 to 400 pounds per square inch is maintained. A part of the absorption liquid, which is not vaporized, is passed from the bottom through pipe 188, is cooled in cooler 189, and passed through pipe 190 and valve 191 to pipe 90 to be recycled to the absorption.

Vaporized hydrocarbons, comprising olefins and a part of the absorption liquid, which has been vaporized, are passed from the top of refractionator 187 through pipe 192 and cooler and condenser 193 to the reflux accumulator 194. A portion of this liquid is returned through pipe 195 and valve 196 by pump 197 to a high point of fractionator 187 as reflux. Another portion is reintroduced into pipe 180 through pipe 198, valve 199, pump 200, and pipe 201. Any vapors or gases accumulating in 194 may be discharged from the system through pipe 202 and valve 203, or may be introduced to pipe 198 through valve 205 in pipe 204.

In the case of the alkylation step, the butane stream entering the system through pipe 100 is passed through valve 101 and pump 102 to heating and reacting zones 104 and 105 respectively in furnace 103. This material is pumped by pump 102 at a pressure between about 1,000 to 10,000 pounds per square inch, and is initially heated in zone or coil 104 to a temperature between about 900 and 1100° F. The olefin-containing stream passing through pipe 183 is heated by flue gases in zone 106 and is passed to manifold 107. From manifold 107 a substantial plurality of streams are fed into the alkylating coil, such as about 10 or 15, or more as high as 50 or 75. These are represented by the three pipes 110, 111, and 112, controlled by valves 113, 114 and 115, respectively, which lead to various points of the stream flowing through coil 105. The material is reacted at a suitable temperature and the effluent passes through pipe 116, cooler and condenser 117, pipe 118 and valve 119 to a depropanizing fractionator 120. Fractionation in depropanizer 120 is aided by conventional bubble trays, not shown, and by suitable cooling means at the top and heating means at the bottom. A gaseous stream comprising $C_3$ hydrocarbons and lower boiling material is passed from the top of 120 through pipe 121, and may be passed through valve 122 to pipe 10 for cracking or dehydrogenation, which has previously been discussed, or may be discharged from the system through pipe 123 and valve 124.

A liquid stream, comprising unreacted butane and reaction products, is passed from the bottom of depropanizer 120 through pipe 126 and valve 127 to a debutanizing fractionator 128, wherein $C_5$ and heavier reaction products are separated from unreacted butane. The kettle is suitably heated to boil out light material, and the $C_5$ and heavier is recovered through pipe 129 and valve 130, and may be subjected to further fractionation and/or other treatment, as may be desirable. Vaporized material is passed from the top of debutanizer 128 through pipe 132 and cooler and condenser 133 to reflux accumulator 134. Any light gases, if such are present, may be removed through pipe 135 and valve 136, as desired. A portion of the condensed material is returned to debutanizer 128 through pipe 137, valve 138 and pump 139 as reflux. Material not needed for reflux is returned to the system by pipe 140 and valve 141, leading to pipe 100.

Even with the high pressures and low temperatures employed in the absorber 150 and the separator 153, some of the butane absorption liquid is vaporized, and passes off through pipe 158. When it is desirable to recover this vaporized material, all or any part of the gas passing through pipe 158 may be passed through pipe 210 and valve 211 to absorber 250 at a low point. In absorber 250 it is contacted with a relatively heavy absorption oil adapted to absorb the butane, which is introduced near the top through pipe 226. Preferably the absorber operates at an elevated pressure only slightly under that in absorber 150, and at a temperature near atmospheric, or somewhat lower. Light, unabsorbed gases are removed through pipe 212, and are discharged from the system through valve 213. Rich absorption oil is removed from the bottom of the absorber through pipe 214 and valve 215, and passes through heater 216 to stripper 249, at a high point thereof, and at a temperature of about 200 to 300° F. Stripper 249 is operated at a considerably lower pressure than absorber 250, such as about 20 to 50 pounds per square inch and the stripping is aided by introduction of a lean stripping gas introduced near the bottom. This stripping gas may be a part of the lean gas which is removed through pipe 212, and which is passed through pipe 217 and valve 218 from pipe 212 to stripper 249. Denuded absorption oil is passed from the bottom of stripper 249 through cooler 220, pipe 221 and valve 222 to the surge tank as accumulator 223. From accumulator 223 lean absorption oil is drawn through pipe 224 by pump 225, and passed through pipe 226 to the top of absorber 250. A gaseous material comprising stripping gases and recovered butane is passed from the top of stripper 249 through pipe 230 and valve 231, and is passed by compressor 232 through cooler and condenser 233 to the butane accumulator 234. Liquid butane so recovered is returned to absorber 150 as a part of the absorption liquid through pipe 235, and valve 236, leading from accumulator 234 to pipe 90. Uncondensed vapors and gases are removed from the top of accumulator 234 through pipe 237 and valve 238, and are passed by recompressor 239 through cooler 240 and pipe 241 to the butane recovery step, as by being introduced from pipe 241 into pipe 210.

While a particular type of thermal alkylation has been described in some detail, other conversion processes known to the art may be used, if desired, especially with different charge stocks, such as when butenes or pentenes are included in the olefins to be reacted. Such should involve union of paraffin and olefins, and may be either noncatalytic or may employ various catalysts such as aluminum chloride or sodium chloroaluminate and the like, concentrated sulfuric acid, concentrated hydrofluoric acid, or the like under conditions suited to the particular charge stock and catalyst used.

One of the advantages of my invention is that, by mixing the absorbent passing through pipe 94 with the gas passing through pipe 151 and subsequently cooling these materials while so mixed, a distinct economy in refrigeration is attained. Not only is it possible to use only a single cooling unit, cooler and condenser 152 but also I can obtain the desired low temperature and heat removal at a distinctly higher temperature level for the cooling medium than I would need to use if the streams were separately used. Thus I have found that when the two streams are separately cooled, and these streams have the compositions just described, it is necessary to use a cooling medium at a temperature of about −120° F. to accomplish the same result as previously described in connection with the use of a cooling medium at a temperature of about −40° F., as described. Likewise, in connection with the cooler and condenser 163, the same advantageous operation is realized. Here not only is one cooler used instead of three, but this one cooler may be operated at an appreciably higher temperature level than if a separate cooler was used on each of the three streams, passing through pipes 166, 169, and 176 respectively.

Many modifications and variations of this invention may obviously be used, and can be adapted by one skilled in the art without departing from the spirit of the disclosure. The restrictions given in the preceding example and description of the drawings need not necessarily be used as limits for all particular operations or sets of conditions, since they are presented primarily as being adapted to one particular set of conditions. It will be understood that the flow diagram is schematic only and that additional pieces of equipment, such as additional tar and carbon removers, pressure gages, valves, pumps, heat exchangers, reflux lines and accumulators, heaters and coolers, and the like will be necessary for any particular installation, and can be supplied to meet the requirements of any particular case by anyone skilled in the art. Essential pieces of equipment and conditions have been described and their functions and modifications discussed in sufficient detail to serve as efficient guides.

I claim:

1. A process for separating heavier hydrocarbons from normally gaseous mixtures containing such hydrocarbons along with not more than 50 per cent by volume of lighter gases in a separating means comprising a separator, an absorber and a fractionator, which comprises passing such a normally gaseous mixture in admixture with a liquid stream from a low point of said absorber and a gas stream from a high point of said fractionator to said separator, passing a gas stream from said separator to a low point of said absorber, introducing an absorption liquid at a high point of said absorber, withdrawing uncondensed lighter gases from a high point of said absorber, passing a liquid stream from the aforesaid separator as a reflux liquid to a high point of said fractionator, and recovering from a low point of said fractionator a liquid comprising said absorption liquid and absorbed heavier hydrocarbons.

2. In the separation of ethylene and heavier hydrocarons from methane and lighter gases, the steps which comprise admixing a gaseous mixture of said materials with a liquid stream from the bottom of an absorber and a gaseous stream from the top of a fractionator, cooling the resultant mixture and passing the cooled mixture to a separator, passing gases from said separator to the bottom of said absorber, introducing liquid butane to the top of said absorber as an absorbent liquid and removing unabsorbed gases and vapors from the top of said absorber and discharging same from the system, passing a liquid from the aforesaid separator to the top of the aforesaid fractionator, and recovering from the bottom of said fractionator a liquid material comprising ethylene and heavier hydrocarbons and substantially free of methane and lighter gases.

3. A process for converting hydrocarbons consisting largely of butanes along with gaseous olefin hydrocarbons into higher boiling hydrocarbons, which comprises passing at least a portion of a hydrocarbon material consisting largely of butanes as an absorption liquid to a separating means comprising an absorber and a fractionator and another portion of said hydrocarbon material to a reaction zone, passing a normally gaseous mixture comprising olefins and gases lower boiling than $C_2$ hydrocarbons to said separating means, admixing said normally gaseous mixture with a gas passing from the top of said fractionator and with a liquid passing from the bottom of said absorber, cooling the resultant admixture to a low subatmospheric temperature and passing the cooled mixture to a separator, passing a gaseous material from said separator to a low point of said absorber, introducing said absorption liquid at a high point of said absorber, eliminating unabsorbed gases from the system, passing a liquid material from said separator as a reflux liquid to a high point of said fractionator, removing from a low point of said fractionator a liquid comprising butanes and absorbed gaseous olefins, passing said liquid to the aforesaid reaction zone, and converting butanes and olefins in said reaction zone to form higher boiling hydrocarbons.

4. A process for reacting butane with normally gaseous unsaturated hydrocarbons by alkylation which comprises passing a normally gaseous mixture comprising such unsaturated hydrocarbons along with methane and hydrogen to a separating means comprising an absorber and a fractionator, admixing with said gaseous mixture a liquid from the bottom of said absorber and a gas from the top of said fractionator, cooling the resultant admixture to a subatmospheric temperature not less than $-50°$ F. and passing the same to a separator, passing uncondensed gases from said separator to a low point of said absorber, passing a condensed liquid from said separator as a reflux liquid to a high point of said fractionator, introducing liquid butane as an absorbing liquid to the top of said absorber and removing unabsorbed gases from the top of said absorber and from said system, removing a liquid comprising butane and absorbed normally gaseous unsaturated hydrocarbons and substantially free of light gases from the bottom of said fractionator and subjecting at least a portion thereof to alkylation conditions to react butane and unsaturated hydrocarbons to form higher molecular weight hydrocarbons.

5. The process of claim 4 wherein said liquid comprising butane is passed to a fractionating means, separating therein a liquid fraction comprising a portion of said butane and returning same as a part of said absorption liquid, separating also a fraction comprising said absorbed unsaturated hydrocarbons along with a further portion of said butane, and subjecting the last said fraction to said alkylating conditions.

6. In the separation of $C_2$ and heavier hydrocarbons from methane and lighter gases, the improvement which comprises passing a gaseous mixture of such materials to a separating means comprising an absorber and a fractionator, withdrawing a liquid stream from a low point of said absorber, withdrawing a gas stream from a high point of said fractionator, admixing said liquid and gas streams and said gaseous mixture, cooling the resultant admixture to condense a part of the vaporous constituents thereof, passing said cooled mixture to a first separator, passing a gas stream from said separator to a low point of said absorber, removing a gas stream from a high point of said absorber, admixing therewith a liquid absorption medium, cooling the resultant mixture to condense vaporous portions thereof and passing said cooled mixture to a second separator, passing a gas from said second separator and discharging said gas from the system, passing a liquid from said second separator to a high point of said absorber, passing a liquid from said first separator to a high point of said fractionator, supplying heat to the bottom of said fractionator, and withdrawing a liquid from a low point of said fractionator.

7. In the process of claim 6, contacting the gas discharged from said second separator with a heavy absorption medium, and passing hydrocarbons recovered from said heavy absorption medium to the aforesaid process as a part of said absorption medium.

8. A process for converting saturated hydrocarbons having two and more carbon atoms per molecule into higher molecular weight hydrocarbons, which comprises subjecting an ethane-propane mixture to a pyrolysis temperature under a low pressure for a period of time sufficient to produce low boiling unsaturated hydrocarbons predominantly ethylene and propylene, separating from the effluent pyrolysis products having four and more carbon atoms per molecule and discharging same from the system, passing lower boiling material from said effluent to a separating means comprising an absorber and a fractionator, passing also to said separating means as an absorbent liquid a low boiling hydrocarbon material of at least four carbon atoms per molecule and introducing same as a liquid to a high point of said absorber at an absorption temperature and pressure, discharging unabsorbed gases from said absorber, removing a liquid from the bottom of said absorber, removing a gaseous mixture from the top of said fractionator, admixing said gaseous mixture, said liquid, and said lower boiling material, cooling the resultant admixture to a low subatmospheric temperature to condense a part of the vaporous constituents thereof, passing the cooled mixture to a gas-liquid separator, passing a gaseous material from said separator to a low point of said absorber, passing a liquid material from said separator as a reflux liquid to the top of said fractionator, removing from a low point of said fractionator a liquid comprising said absorbent liquid and said low boiling unsaturated hydrocarbons, and treating the last said liquid under conversion conditions to form higher molecular weight hydrocarbons.

9. A process for converting low-boiling paraffins of at least four carbon atoms per molecule along with gaseous olefin hydrocarbons into higher boiling hydrocarbons, which comprises passing a low-boiling hydrocarbon material containing paraffins of at least four carbon atoms per molecule as an absorption liquid to an absorber, passing a normally gaseous mixture comprising olefins and gases lower boiling than $C_2$ hydrocarbons to a separator, passing a gaseous mixture from said separator to a low point of said absorber, discharging unabsorbed gases from said absorber, passing a rich absorption liquid from said absorber to said separator, passing a liquid mixture from said separator to a fractionator as a reflux, passing a gaseous mixture from said fractionator to said separator, removing from the bottom of said fractionator a liquid comprising said original absorption liquid and absorbed olefins, and passing said liquid to a reaction zone to form therefrom higher boiling hydrocarbons.

KARL H. HACHMUTH.